(12) United States Patent
Mulligan et al.

(10) Patent No.: US 8,838,635 B2
(45) Date of Patent: *Sep. 16, 2014

(54) SOFTWARE UPDATE MANAGEMENT

(75) Inventors: Scott Mulligan, San Jose, CA (US); Benjamin Beasley, San Jose, CA (US)

(73) Assignee: Apple Inc., Cupertino, CA (US)

( * ) Notice: Subject to any disclaimer, the term of this patent is extended or adjusted under 35 U.S.C. 154(b) by 248 days.

This patent is subject to a terminal disclaimer.

(21) Appl. No.: 13/196,935

(22) Filed: Aug. 3, 2011

(65) Prior Publication Data

US 2011/0289495 A1    Nov. 24, 2011

Related U.S. Application Data

(63) Continuation of application No. 11/012,455, filed on Dec. 15, 2004, now Pat. No. 8,019,725.

(51) Int. Cl.
*G06F 17/30* (2006.01)
*G06F 9/445* (2006.01)

(52) U.S. Cl.
CPC ........................................ *G06F 8/61* (2013.01)
USPC ........................................ 707/759; 717/168

(58) Field of Classification Search
None
See application file for complete search history.

(56) References Cited

U.S. PATENT DOCUMENTS

| | | |
|---|---|---|
| 5,684,952 A | 11/1997 | Stein |
| 5,724,530 A | 3/1998 | Stein et al. |
| 5,764,992 A | 6/1998 | Kullick et al. |
| 5,835,911 A | 11/1998 | Nakagawa et al. |
| 6,073,214 A | 6/2000 | Fawcett |
| 6,138,153 A | 10/2000 | Collins, III et al. |
| 6,167,567 A | 12/2000 | Chiles et al. |
| 6,173,446 B1 | 1/2001 | Khan et al. |
| 6,199,204 B1 | 3/2001 | Donohue |
| 6,496,875 B2 | 12/2002 | Cheng et al. |
| 6,557,054 B2 | 4/2003 | Reisman |
| 6,732,275 B1 | 5/2004 | Dimenstein |
| 6,760,908 B2 | 7/2004 | Ren |
| 6,769,009 B1 | 7/2004 | Reisman |
| 7,370,092 B2 | 5/2008 | Aderton et al. |
| 7,574,706 B2 * | 8/2009 | Meulemans et al. .......... 717/174 |
| 2004/0230965 A1 | 11/2004 | Okkonen |

* cited by examiner

*Primary Examiner* — Belix M Ortiz Ditren
(74) *Attorney, Agent, or Firm* — Novak Druce Connolly Bove + Quigg LLP

(57) ABSTRACT

A software update method permits a local software update server to act as an update source for client computer systems in its local network. The local update server provides updates for one or more specified groups of client computers. In one disclosed embodiment, the method includes receiving software updates at a local server, receiving (at the local server) an update request from a client computer system and sending the client a list identifying one or more applicable updates (e.g., a catalog of available update packages) based on the client computer's membership in one or more of a plurality of user groups. In another embodiment, a single local server may supply update services for client computer systems belonging to a plurality of specified computer groups.

34 Claims, 2 Drawing Sheets

SOFTWARE UPDATE MANAGEMENT

CROSS-REFERENCE TO RELATED APPLICATIONS

The present disclosure is a continuation application of co-pending U.S. patent application Ser. No. 11/012,455, filed 15 Dec. 2004, and entitled "Software Upgrade Management" which is incorporated by reference herein in its 999 99 entirety.

BACKGROUND

The present invention relates generally to the distribution of software updates via a computer network. As used herein, a "computer network" comprises any number of computer systems (e.g., personal computers, workstations, servers, etc.) that are able to exchange information with one another. Computer systems in a computer network may be arranged in any configuration, use any medium for communication (e.g., wired or wireless) and any communication protocol.

A typical computer system, such as a personal computer system, typically has a variety of software products installed and available for execution. Example software products include the operating system, device drivers, code libraries, utilities, and user programs such as, for example, calendar, contact (i.e., "address book"), web browser and graphics applications. It is common practice in the commercial software industry for software and/or computer system vendors to provide periodic software updates to their customers (e.g., patches, fixes, new versions of existing software and new software).

The prior art provides two general approaches to delivering software updates over a computer network. In the first approach, a client or end-user computer system contacts a software provider's update server directly. In the second approach, a client computer system obtains updates from a software provider's update server through a local update server—generally belonging to the same intranet or local area network as the client computer system. The first update approach requires the software provider's update server have sufficient capacity to reliably handle all user requests. The second approach provides a direct means for an institutional user (e.g., an academic campus or commercial intranet provider) to limit the updates provided to its users while also reducing the number of update downloads that the update server must provide. Neither approach, however, addresses the update server's computational load associated with providing software updates. Thus, it would be beneficial to provide a software update mechanism that can reduce the computational resources and the number of update downloads a software vendor must provide during an update procedure.

SUMMARY

The invention provides a software update method applicable to tiered network architectures—that is, where a client communicates to a software update server through at least one intermediary or local server computer system. The method includes receiving software updates at a local server, receiving (at the local server) an update request from a client computer system and sending the client a list identifying one or more applicable updates (e.g., a catalog of available update packages) based on the client computer's membership in one or more of a plurality of user groups. In one embodiment, the local server maintains an update list applicable for each user-group it provides update service to (e.g., a "system administrator," "software developer" or "student" user-groups). Each client may then obtain software updates from the local-server, where update packages may be obtained directly from the local server or from another computer system in the local network of which the client computer is a member. In another embodiment, the local server may also receive a revocation or withdrawal list from the update server. In this embodiment, the revocation list may identify one or more software update packages previously made available from the update server but which should no longer be distributed. In response to the revocation list, the local server could cease distributing the identified software update package(s). The revocation list could be obtained by the local server as a separate and discrete update list from an update source, or it could be received as part of a larger software update list. Methods in accordance with these embodiments of the invention may be stored in any media that is readable and executable by a computer system.

DETAILED DESCRIPTION

The following description is presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

Figure 1:
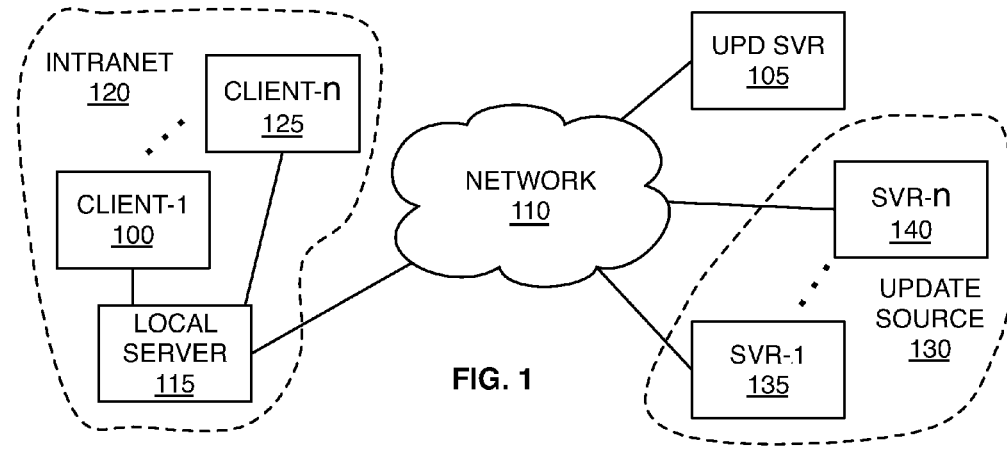
FIG. 1 shows a computer system to which a software update process in accordance with one embodiment of the invention may be applied.

Referring to FIG. 1, in one embodiment of the invention client or end-user computer system 100 communicates with commercial software vendor's update server 105 through network 110 and local server 115. In the illustrative topology of FIG. 1, intranet 120 comprises a plurality of client computer systems 100-125, each of which may communicate with update server 105 through local server 115 and network 110. It is currently common practice for commercial software vendors to host and maintain update server 105 and to use third party resources 130 (e.g., computer servers 135-140) to store and serve their update packages to customers. It will be recognized that the services provided by update server 105 and update source 130 could also be provided by a single computer system or a plurality of co-located computer systems. In this configuration, client computers 100-125 and local server 115 are typically components of a local area network or intranet 120 administered by an academic, corporate or commercial entity. It will be recognized that network 110 may be a public, private or a combination of public and private networks.

Figure 2A:
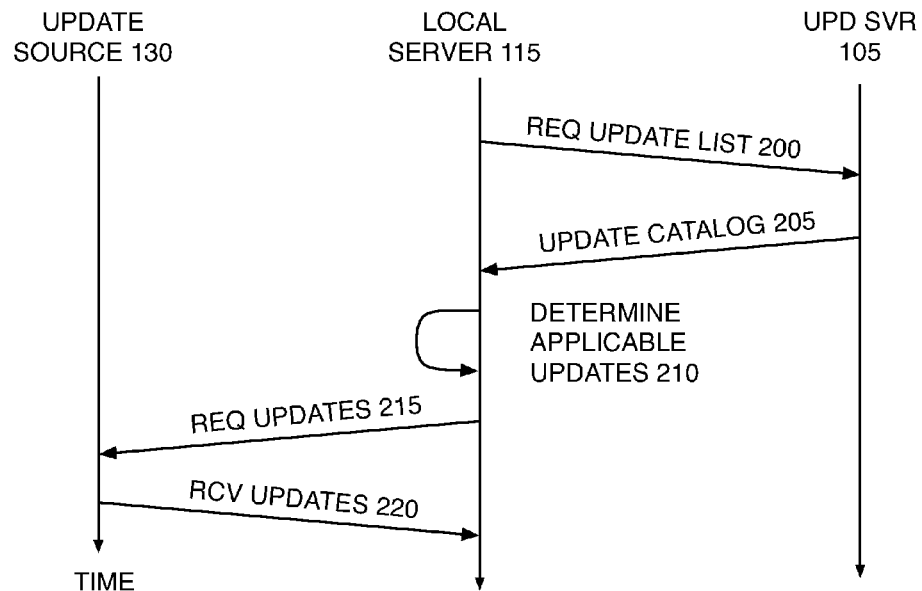
FIGS. 2A and 2B show a software update process in accordance with one embodiment of the invention.

Referring to FIG. 2A, an update process for the configuration of FIG. 1 begins when local server 115 requests a list of updates available from update server 105 (200). The target vendor's update server responds by transmitting a catalog of available update packages (205). In one embodiment, the update catalog comprises a list of all software updates provided by the update server's owners. In another embodiment, the update catalog comprises a list of less than all of the updates provided by the update server's owners (e.g., only those updates associated with a specific product line). In general, each catalog entry may include information that identifies the update package (e.g., the iTunes application provided by Apple Computer, Inc. of Cupertino, Calif.), the update version (e.g., version 4.6, Build 15) and a location from which the update may be obtained (e.g., update server 105 or update source 130 via, for example, HTTP links (205). Next, local server 115 determines which available updates are applicable to the client computer systems within its network 120 (210). Local server 115 then requests (215) and receives (220) updates from update source 130.

In one embodiment, intranet 120 comprises a plurality of local servers (e.g., like 115), each of which is tasked to provide update services for a specified group of client computer systems (e.g., 100-125). In this embodiment, each local server may obtain its own set of update packages in accordance with FIG. 2A where only those update packages that are applicable to the client computer system groups receiving update services from the local server are obtained. Illustrative groups include, but are not limited to, "engineer," "manager," "secretary," "software developer," "system administration," and "student."

Figure 2B:
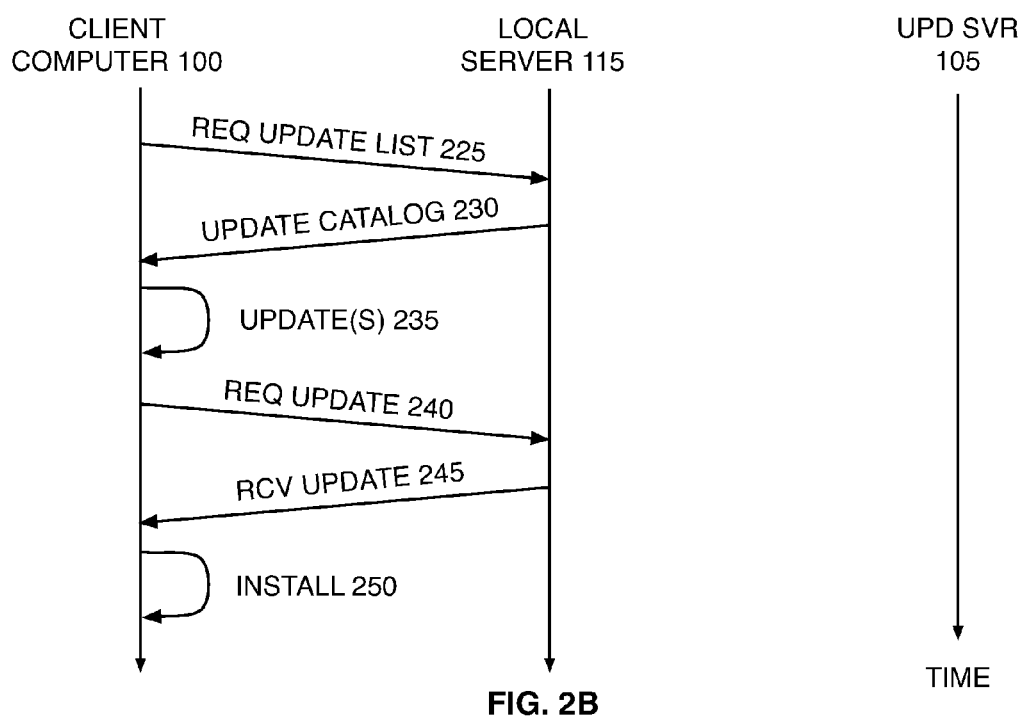

Referring to FIG. 2B, in this embodiment, following the acts of FIG. 2A (200-220), client or end-user computer system 100 in intranet 120 issues an update request to local server 115 (225). In one embodiment, client 100 identifies an appropriate local server 115 through a directory service (e.g., LDAP). In another embodiment, client 100 is configured via, for example, a local environment variable or a preset system preferences value to contact local server 115. In response, local server 115 provides a catalog list to requesting client computer 100 (230). Client computer 100 displays through, for example, a graphical user interface, the updates identified in the catalog list. From the displayed updates, an end-user operating client computer 100 requests one or more updates from local server 115 (235). When the requested updates are received (240-245), they are installed on client computer 100 (250).

In another embodiment, a single local server (e.g., local server 115) may supply update services for client computer systems (e.g., 100-125) belonging to a plurality of specified groups. In this embodiment, each local server may update packages (in accordance with FIG. 2A) applicable to each client computer system group receiving update services from the local server. If the local server generates an "applicable update" list unique to each client computer group, each clients' interaction with the local server could follow the process described and shown in FIG. 2A. If, on the other hand, the local server generates a catalog list that includes updates that may or may not be applicable to a specific group, each client computer interacting with the local server may process received catalog listings to determine which of the available updates are applicable to it. That is, it would be the requesting client's task to determine which of the available update packages are applicable to its specific configuration. For example, perhaps not all of the software identified in the catalog is licensed on client 100. Further, a software package identified in the catalog list may not be applicable to the user group(s) to which the client computer belongs. Accordingly, updates for these products would not be applicable.

In this latter embodiment, it will be recognized that the catalog list provided by a local server (e.g., 115) to a client computer (e.g., 100) may be different from the catalog list provided by a software vendor's update server (e.g., 105) to the local server. It will further be recognized that the catalog list provided by a local server (e.g., 115) to a first client computer (e.g., 100) may be different from the catalog list provided by the local server to a second client computer (e.g., 125).

In another embodiment, local server (e.g., 115) may obtain a revocation or withdrawal list from an update source (e.g., 130). A revocation list may identify one or more software update packages previously made available by the update source. In this embodiment, the identified revoked software update package(s) would no longer be made available by the local server to its client computer systems (e.g., 100-125). In this manner, a previously provided but errant software update package may be "withdrawn" by alerting a local server to stop making it available. In another embodiment, the local server may notify its client computer systems that have already obtained the "withdrawn" software update package.

As illustrated and discussed above, embodiments in accordance with FIG. 2B provide at least three significant benefits to vendors distributing software updates via a network and to administrators of local networks (e.g., intranet 120). First, client computer systems do not directly interact with vendor's update server 105. Second, the inventive architecture permits intranet administrators, via local server 115, to customize what updates available from vendor's update server 105 are made available to client computers (e.g., 100-125)—different collections of updates may be made available to different groups of users. Further, each local server computer system undertakes the computational task of determining which of the available updates are applicable to it (210). In contrast, the known prior art relies on the vendor's update server to provide this determination. Accordingly, update processing in accordance with these embodiments of the invention reduces the computational load on a vendor's update server and the amount of network traffic required to support an update operation while simultaneously providing increased flexibility and update control for local area network administrators.

Various changes in the illustrative configurations as well as in the details of the illustrated operational methods are possible without departing from the scope of the following claims. For instance, the act of identifying update packages to install may be automated (i.e., 235). Similarly, installing updates may be automated (i.e., 250). It will also be recognized that local server 115 may identify a location other than itself for its client computer systems to obtain update packages. For example, local server 115 may identify one or more servers that are part of intranet 120 (not shown in FIG. 1) from which all client computer systems obtain update packages. In addition, following receipt of updates (e.g., 245), update statistics may be sent back to vendor update server 105. This type of information typically includes identification of each upgrade package obtained/installed and the date the upgrade package was obtained/installed. Further, in the illustrative methods of FIGS. 2A and 2B the acts of synchronizing local server 115 (200-220) may be performed asynchronously and independently of client-initiated updates (225-250). In addition, local server 115 may contact a plurality of vendor update servers, generating catalog lists that incorporate update packages from more than one vendor update server and may even include update packages generated by the local update server's owners/administrators. Further, in one embodiment local server 115 is configured to periodically request update lists from update server 105. In another embodiment, local server 115 requests an update list from update server 105 at an interval that is inversely proportional to the age of the last received update list (i.e., catalog 205). Additionally, acts in accordance with FIGS. 2A and 2B may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

What is claimed is:

1. A software update method, comprising:
   receiving, at a second computer system configured to distribute software, an update request from a local update server, the local update server configured to obtain software for a first client computer system having membership in a first computer group and a second client computer system having membership in a second computer group different than the first computer group, wherein the update request identifies a composite group of software update packages for the first client computer system and the second client computer system;
   identifying, by the second computer system, at least a portion of one or more sources from which the composite group of software updated packages are available;
   sending, from the second computer system to the local update server, a message comprising identified software update packages and their corresponding sources of availability;
   sending, from the second computer system to the local update server, a first catalog list identifying only applicable updates for the first client computer system based the first client computer system's membership in the first computer group; and
   sending, from the second computer system to the local update server, a second catalog list identifying only applicable updates for the second client computer system based the second client computer system's membership in the second computer group.

2. The method of claim 1, further comprising:
   obtaining, at the first computer system, the identified software update packages from the sources of availability identified in the message.

3. The method of claim 1, wherein the one or more sources comprise sources exclusive of the second computer system.

4. The method of claim 1, wherein the one or more sources comprise the second computer system and at least one other source.

5. The method of claim 1, wherein the software update packages identified in the message comprise upgrades to a software application.

6. The method of claim 1, wherein the software update packages identified in the message comprise a stand-alone software application.

7. A computer system configured to assist in performing a software update, the computer system comprising:
   a network communication interface;
   a datastore containing software update packages;
   a processor communicatively coupled to both the network communication interface and the datastore, the processor configured to receive an update request, via the network communication interface, from a local update server, the local update server configured to assist in obtaining software for a first client computer system having membership in a first computer group and a second client computer system having membership in a second computer group different than the first computer group, wherein the update request identifies a composite group of software update packages for the first client computer system and the second client computer system, identify, using the processor, one or more sources from which at least a portion of the composite group of software updated packages are available, send, via the network communication interface, a message to the local update server comprising identified software update packages and their corresponding sources of availability, send, from the second computer system to the local update server, a first catalog list identifying only applicable updates for the first client computer system based the first client computer system's membership in the first computer group, and send, from the second computer system to the local update server, a second catalog list identifying only applicable updates for the second client computer system based the second client computer system's membership in the second computer group.

8. The computer system of claim 7, wherein the sources comprise the data store and at least one other source.

9. The computer system of claim 7, wherein the sources comprise sources exclusive of the data store.

10. The computer system of claim 7, wherein the software update packages identified in the message comprise upgrades to a software application.

11. The computer system of claim 7, wherein the software update packages identified in the message comprise a stand-alone software application.

12. A non-transitory program storage device, readable by a programmable control device, comprising instructions stored on the program storage device for causing the programmable control device to perform a method comprising:
   receiving, at a second computer system configured to distribute software, an update request from a local update server, the local update server configured to obtain software for a first client computer system having membership in a first computer group and a second client computer system having membership in a second computer group different than the first computer group, wherein the update request identifies a composite group of software update packages for the first client computer system and the second client computer system;
   identifying, by the second computer system, at least a portion of one or more sources from which the composite group of software updated packages are available;
   sending, from the second computer system to the local update server, a message comprising identified software update packages and their corresponding sources of availability;
   sending, from the second computer system to the local update server, a first catalog list identifying only applicable updates for the first client computer system based the first client computer system's membership in the first computer group; and
   sending, from the second computer system to the local update server, a second catalog list identifying only applicable updates for the second client computer system based the second client computer system's membership in the second computer group.

13. A computer system configured to assist in performing a software update, the computer system comprising:
   a network communication interface; and
   a processor communicatively coupled to the network communication interface and configured to—receive, via the network communication interface, a first update request from a first client computer system for software updates, the first client computer system having a membership in a first client computer group, receive, via the network communication interface, a second update request from a second client computer for software updates, the second client computer system having a membership in a second client computer group, send, via the network communication interface, a first message to a second computer system, the first message based on a composite of the first and second update requests, the first message identifying a composite group of software update packages to be obtained from sources identified by the second computer system, obtain, via the network communication interface, the composite group of software update packages, send, via the network communication interface, a second message to the first client computer system, the second message based on the first client computer group membership and identifying a first group of software update packages, from the composite group of software update packages, to be obtained from the computer system, and send, via the network communication interface, a third message to the second client computer system, the third message based on the second client computer group membership and identifying a second group of software update packages to be obtained from the computer system wherein the first group of identified software updates is not identical to the second group of identified software updates.

14. The computer system of claim 13, wherein the first client computer group membership additionally comprises membership in a first predetermined user-group.

15. The computer system of claim 14, wherein the second client computer group membership additionally comprises membership in a second predetermined user-group.

16. The computer system of claim 13, wherein the first group and the second group of identified software update packages differ by at least one identified software update package.

17. The computer system of claim 13, wherein the second and third messages identify each software update package with an update package identifier, an update version identifier and a location identifier.

18. The computer system of claim 13, wherein the computer system maintains a unique update package availability list for each of a plurality of client computer system computer groups.

19. The computer system of claim 13, wherein the software update packages identified in the second message comprise upgrades to a software application.

20. The computer system of claim 13, wherein the software update packages identified in the second message comprise a stand-alone software application.

21. A computer system configured as a local update server to assist in performing a software update, the computer system comprising:
a processor; and
a network communication interface; and
a processor communicatively coupled to the network communication interface and configured to—request and receive, via the network communication interface, a group of software update packages from a distal update server, the group of software update packages based on a composite of software associated with computer group memberships for a plurality of computers, the plurality of computers configured to receive software updates from sources identified by the local update server;
receive a first update request from a first client computer system, the first client computer system having a first computer group membership;
receive a second update request from a second client computer, the second client computer system different from the first client computer system and having a second computer group membership;
send a first message, responsive to the first update request, to the first client computer system, the first message based on the first computer group membership, the first message identifying a first group of software update packages to be obtained from sources identified by the local update server; and
send a second message, responsive to the second update request, to the second client computer system, the second message based on the second computer group membership, the second message identifying a second group of software update packages to be obtained from sources identified by the local update server wherein the first group of identified software updates is not identical to the second group of identified software updates.

22. The computer system of claim 21, wherein the distal update server comprises a software vendor update server.

23. The computer system of claim 21, wherein the local update server, the first client computer system, and the second client computer system are members of a common intranet.

24. The computer system of claim 21, wherein the processor is further configured to:
obtain update software packages from the distal update server, based on the computer group membership of the first and second client computer systems, periodically, and independently of requests from the first and second client computer systems.

25. The computer system of claim 24, wherein at least one of the software update packages obtained from the distal update server is not installed on the local update server.

26. The computer system of claim 21, wherein the processor is further configured to:
receive a withdrawal message from the distal update server, the withdrawal message identifying one or more software update packages.

27. The computer system of claim 26, wherein the computer system stops identifying the one or more software update packages identified in the withdrawal message to the first and second client computer systems.

28. The computer system of claim 21, wherein the first computer group membership additionally comprises membership in a first predetermined user-group.

29. The computer system of claim 21, wherein the second computer group membership additionally comprises membership in second predetermined user-group.

30. The computer system of claim 21, wherein the first and second messages identify each software update package with an update package identifier, an update version identifier and a location identifier.

31. The computer system of claim 30, wherein the location identifier identifies a computer system different from the local update server.

32. The computer system of claim 21, wherein the processor is further configured to:
maintain a unique update package availability list for each of a plurality of client computer system groups.

33. The computer system of claim 21, wherein the software update packages identified in the first message comprise upgrades to a software application.

34. The computer system of claim 21, wherein the software update packages identified in the first message comprise a stand-alone software application.

\* \* \* \* \*